Figure 22:
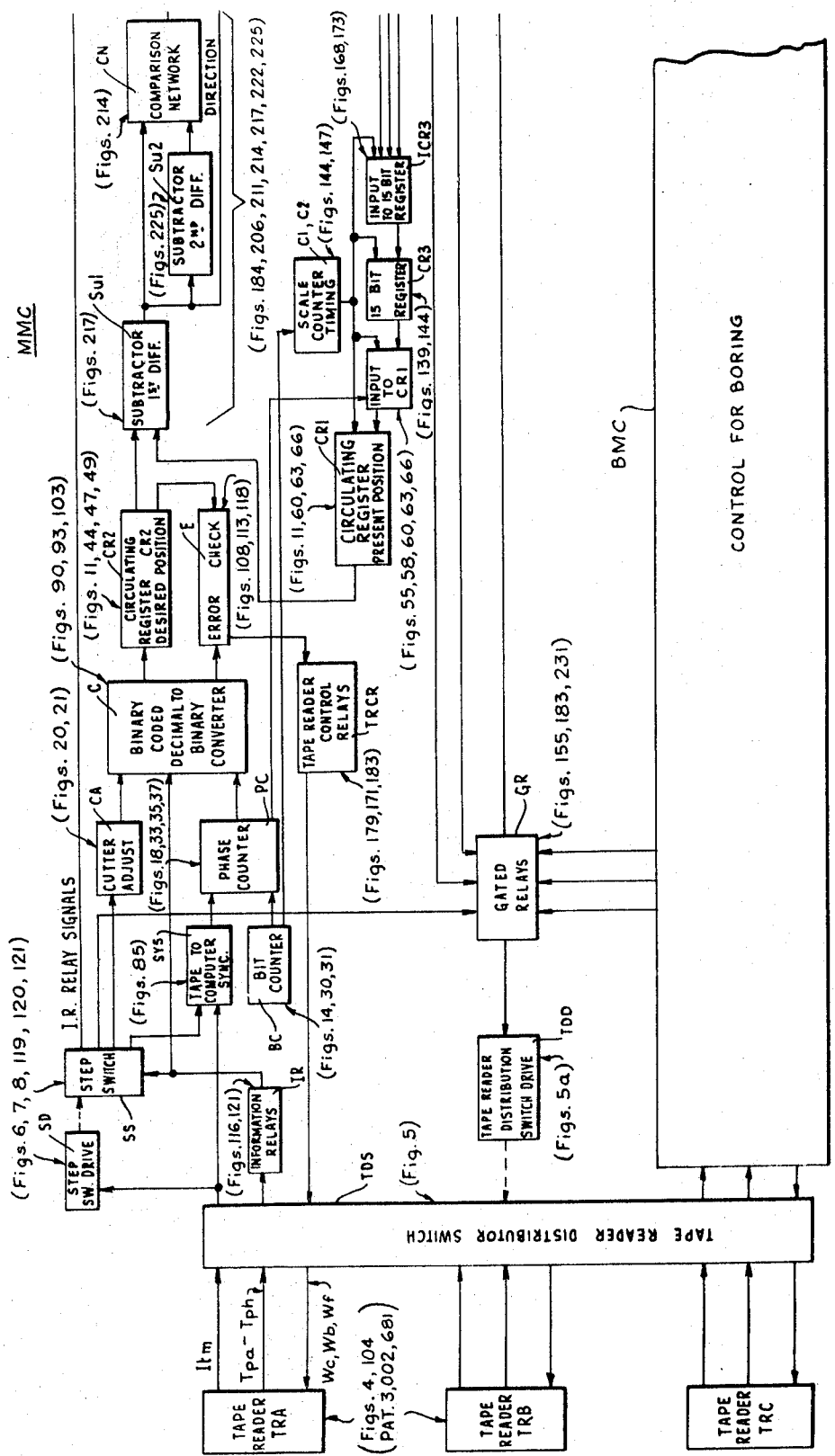

United States Patent [11] 3,609,497

| [72] | Inventors | Tom T. Kumagai<br>Gardena;<br>William C. Leone, Palos Verdes Estate;<br>Michael May, Los Angeles; Harold A.<br>Shoemaker, Santa Monica; Roy A. Howard,<br>Manhattan Beach, all of Calif. |
|---|---|---|
| [21] | Appl. No. | 598,525 |
| [22] | Filed | Jan. 12, 1966 |
| [23] | | Division of Ser. No. 827,981, Mar. 10, 1959, Pat. No. 3,245,144. |
| [45] | Patented | Sept. 28, 1971 |
| [73] | Assignee | Houdaille Industries, Inc.,<br>Buffalo, N.Y. |

[54] NUMERICAL CONTROL INCLUDING ZERO OFFSET AND PULSE COUNTING DIGITAL COMPARISON
7 Claims, 2 Drawing Figs.

[52] U.S. Cl. .................................................. 318/610,
318/603, 90/13, 235/151.11
[51] Int. Cl. .................................................. G05b 19/28
[50] Field of Search ................................................ 318/20.315
UX, 20.120 UX, 20.310 UX; 90/13; 235/151.11

[56] References Cited
UNITED STATES PATENTS

| 2,775,727 | 12/1956 | Kernahan et al. ............ 318/(20.310) |
| 3,218,532 | 11/1965 | Toscano ...................... 318/(20.120) |
| 2,820,187 | 1/1958 | Parsons et al. ............ 318/(20.120 UX) |
| 2,933,244 | 4/1960 | Tripp ........................ 318/(20.120 UX) |
| 3,073,998 | 1/1963 | Bower ........................ 318/(20.120 UX) |
| 2,676,289 | 4/1954 | Waltsberg et al. ............ 318/20.315 UX |
| 2,792,545 | 5/1957 | Kamm ........................ 318/20.315 UX |
| 2,796,566 | 6/1957 | Maynard et al. ............ 318/20.315 UX |

OTHER REFERENCES

Follingstad et al., " An Optical Position Encoder and Digit Register," Proceedings of the I.R.E., Vol. 40, No. 11, pps. 1573- 1583, Nov. 1952.

Primary Examiner—T. E. Lynch
Attorneys—Ernest F. Oberheim and James K. Haskell

ABSTRACT: A numerically controlled positioning system for positioning a movable member, employing serial signal processing circuits having circulating registers for receiving discrete input signals representative of a desired position of the member and for receiving feedback signals of actual position of said member, in which, arithmetic combinations of the input signals, compensated as required for position offset, and the feedback signals, provide control signals for positioning the member.

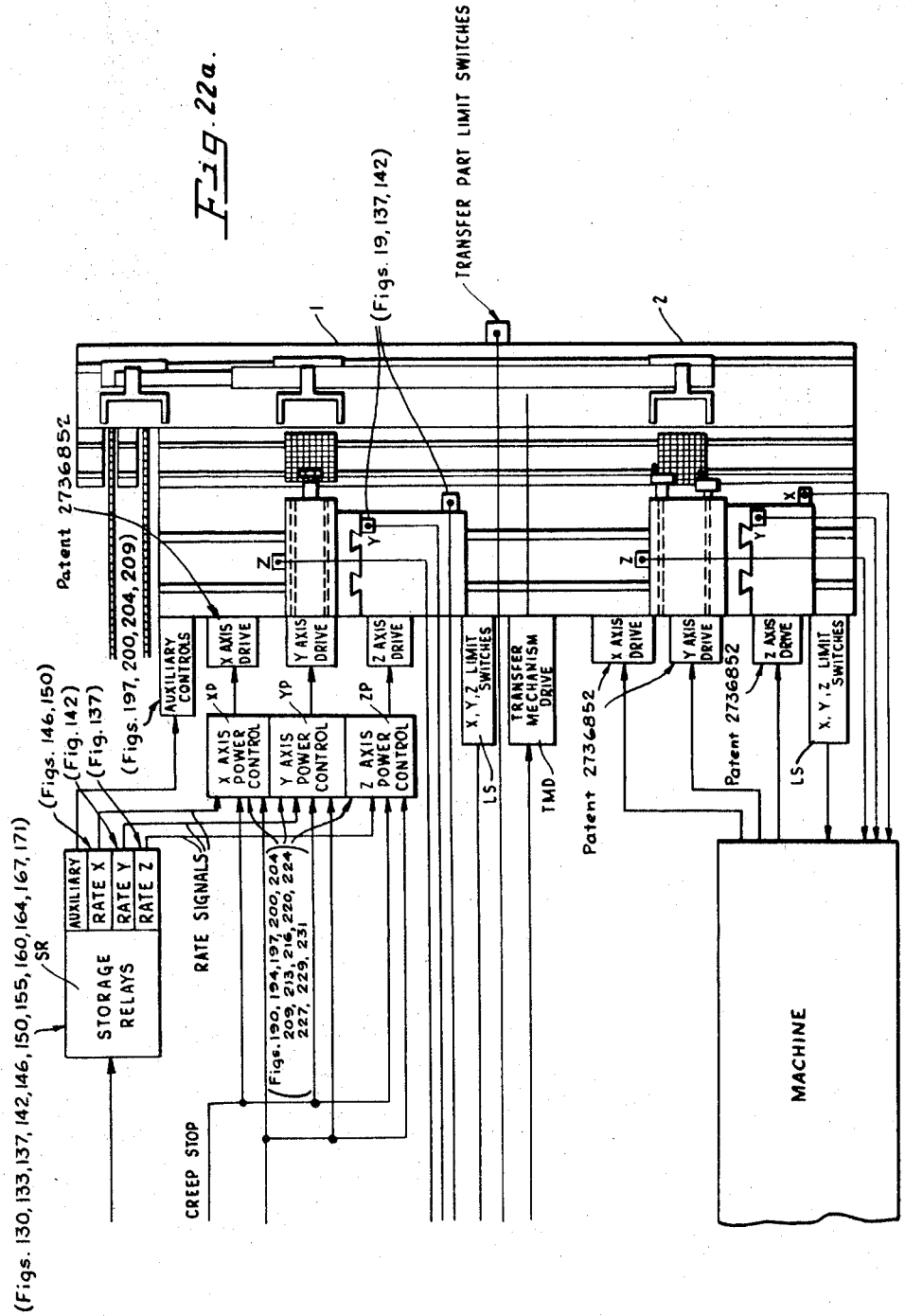

NUMERICAL CONTROL INCLUDING ZERO OFFSET AND PULSE COUNTING DIGITAL COMPARISON

CROSS-REFERENCE TO RELATED APPLICATION

This application is a division of application Ser. No. 827,981, filed Mar. 10, 1959, for TOOL CHANGER PRODUCTION LINE, now U.S. Pat. No. 3,245,144.

BRIEF SUMMARY OF THE INVENTION

This invention relates generally to numerical control systems, and in particular to numerical control systems for controlling the positioning of a member.

The invention embodies a serial system of numerical controls using circulating registers of the delay line type for processing desired position signals derived from a program, such as a perforated tape, along with information received from transducers controlled by a member being positioned by the system for the purpose of positioning the member. Provision is made for correcting desired position signals from the program using a position offset control for generating signals indicative of desired position corrections, which latter signals under the control of signals from the program are algebraically combined at particular times in the circulating registers with signals from the program to achieve a corrected signal indication of a desired position.

Essential features of the invention are illustrated in FIGS. 22 and 22a forming a part of these application papers. These figures of the drawings are correspondingly numbered in U.S. Pat. No. 3,245,144, referenced hereinabove, of which this application is a division. Particular attention is directed to specific portions of U.S. Pat. No. 3,245,144 as follows:

DRAWINGS

Column 6, lines 4–9, 16–53 and 69–72, covering FIGS. 3, 4, 6, 7, 7a, 8 through 22, and FIGS. 30 through 231.

BACKGROUND AND GENERAL INFORMATION CONCERNING THE INVENTION

Column 1, lines 42–44, lines 51–58, lines 55–72.
Column 3, lines 1–16.
Column 4, lines 71–75.
Column 5, lines 1–20 and 42–70.

DESCRIPTION OF THE INVENTION

Column 35, lines 55–75.
Columns 36 through 42.
Column 43, lines 68–75.
Column 44, entirely.
Column 45, lines 1–48.
Column 46, lines 74–75.
Columns 47–53.
Column 54, lines 1–4.
Column 57, lines 3–75.
Columns 58–67.

COMPONENT DETAILS AND FUNCTIONS

Column 9, beginning with "TAPE FORMAT" through Column 35, line 52.

RELAY CONTROLS AND FUNCTIONS

Column 67, at the bottom, through column 78.

LOGICAL DESIGN

Columns 78–142.
The logical design of the claimed milling machine control system is covered here in terms of the boolean expressed relationships.

ELEMENTARY SYSTEM

FIGS. 22 and 22a is a block diagram of an automatic machine tool system for two machine tools. This organization inheres the elementary principles of the three machine tool control system illustrated in FIG. 2 but is reduced to two machines in the interest of simplicity at this point. This tool system again inheres the concept of a numerically controlled arrangement utilizing a numerical program of some sort, which in this practical embodiment involves a punched tape, wherein the punched tape includes all of the instructions for machining a workpiece or a part in the machine tool line, here represented as including a milling machine 1 and a boring machine 2. Three tape readers of the type referred to hereinabove designated TRA, TRB and TRC, respectively, are herein provided, one being a spare at all times and all being selectively electrically connected to the machine tool control systems indicated through the tape distributor switch TDS described hereinabove. With reference to tape reader TRA which is connected into the electrical control system for the milling machine, the outputs of tape reader contacts $T_{pa}$ through $T_{ph}$ are applied as inputs to a corresponding group of relays here represented as a block of information relays designated IR and including individual information relays $I_a$ through $I_h$. The output of the information relay group is applied as input to a stepping switch assembly generally designated SS comprising two stepping switch sections SS1 and SS2 (see FIGS. 6 and 7, respectively, see also FIGS. 115, 119, 120 and 121) and is also applied as input to a binary coded decimal to binary converter arrangement generally designated by a block C (flip-flops FQ1, FQ). This block of equipment, in conjunction with the circulating register CR2 which receives information from the converter, provides a serial type of straight binary representation of the instructions concerning desired position, received through the information relays IR from the tape reader contacts, in turn controlled by the tape. The stepping switch assembly is stepped in synchronism with the tape reader by means of a stepping switch drive generator generally designated SD which is controlled by a suitable cam switch signal generated in the tape reader and designated $I_{tm}$ which is applied through the tape reader distributor switch as input to the stepping switch drive. As the stepping switch steps along in synchronism with the tape reader, selected IR relay signals are transmitted to a group of storage relays generally designated SR which control auxiliary functions of the machine tool as well as controlling the rates in each of the X,Y and Z axes. By this expedient, information concerning the rates in each of the three axes of freedom of the milling machine are set into suitable milling machine controls designated XP, YP and ZP for the X axis, Y axis, and Z axis power controls. The outputs of the three power controls are applied to the X axis, Y axis, and Z axis drives indicated.

As noted earlier in this specification, all of the dimensional information on the tape is programmed for a point cutter. Provision is therefore made for providing cutter adjustments indicating the actual dimensions of the cutter. This is provided by means of a cutter adjust arrangement comprising pluralities of wafer switches, described in connection with FIGS. 20 and 21, producing binary decimal coded signals corresponding to the tape reader signals, under the control of stepping switch contacts. The organization is such that when information is being applied to the circulating register relating to dimensions concerning machine operations the cutter adjust corrections from cutter adjustment control CA, having the same binary decimal coded significance as a coded instruction from the tape, are applied to the circulating register through the converter C immediately after the signals for that portion of the dimensions are applied from the tape and the correction made at that level of coding.

Synchronization between the tape reader and both circulating registers CR1 and CR2 is provided by means of a timing section including a bit counter generally designated by the block BC and referred to in FIG. 14 hereinabove and a tape to computer synchronizing arrangement generally designated SYS. The outputs of both of these circuits are applied as inputs to the phase counter, see FIG. 18, which controls the operating phases of the system. The phase counter output is also applied to the system through the binary coded decimal to binary converter C.

Each line of information read from the tape is checked for errors. Similar information in the circulating register concerning dimensions are also checked for error. The parity selected for tape coding is odd. Thus in any row of dimensional information in the tape, the number of punched holes provided, if even rather than odd, must be immediately compensated by a parity hole punched in column $1h$. If at any time during reading of information from the tape a parity error shows up whether as a result of improper coding on the tape or as a result of malfunction of the tape reader, signals developed by the error detector circuit are applied through suitable tape reader control relays generally designated TRCR through the tape distributor switch TDS to tape reader control circuits. This operation stops and reverses the tape reader which steps backwards until start code is read. If the error occurs the second time the tape reader is stopped at that point and system operation is interrupted. The system also provides an error check on the electronic information in the circulating registers. This is accomplished by taking the mod 3's of the numbers in the registers and running a continuous mod 3 check on the information which is circulating.

If during the error check on the electronic portion of the system an error develops the system is automatically stopped.

After one block of the milling instructions has been read from the tape, and the information is properly stored in the circulating register, the milling machine acts on this information. Depending upon the instructions programmed in the tape the machine may operate either to move in single axis, that is, X, Y and Z sequentially, or may move in a multiple axis mode in which the controls operate to simultaneously drive the tool in its three axis. The single axis mode is assumed for purposes of this description.

As the machine axis moves in X, then in Y, then in Z, the three detector head assemblies generally depicted as $Hmx$, $Hmy$ and $Hmz$, sequentially produce output signals, say in the order named, which are applied to input circuits of a short 15-bit circulating register CR3 which is also of the magnetostrictive delay line-type. This register and the associated input circuits ICR3 serves as an input buffer to the present position circulating register CR1. As will be recalled from the general description of the scale counters, the electromagnetic heads produce discrete signals indicative of incremental 1 mil displacements along the respective axis. The counts which are produced are serially entered into the present position register CR1. Therefore, at all times the electronic control unit contains the actual count of the present position of the axis.

A subtraction is always made between the present and the desired position register contents. This is accomplished in a first difference subtracter circuit $Su1$ the output of which is applied to one input terminal of a comparison network CN. This comparison circuit includes 2 built-in anticipation counts the first of which produces a signal which is effective to reduce the machine speed in any single axis from high range to low range maximum and the second of which, operating on a lower count, produces an output signal which puts the machine into its creep mode of operation. When the contents of the present position register equals the contents of the desired position register a stop signal is produced which stops the axis. At this point, the positioning will be of the order of 0 to minus a half-thousandths of the desired position. Timing of the present position register and the buffer register CR3 and associated equipment is achieved by the scale counter timing section under control of the bit counter BC.

In the single axis control mode of operation, with a single block of instructions programmed on the tape in the order X, Y, and Z, the milling operation will be limited to the use of the front face of the milling cutter. With this assumption, the tool will follow the instructions from the electrical control system and be displaced to the desired position in the X axis, thereafter be displaced vertically to a desired position in the Y axis following which the tool will be fed at a predetermined rate as programmed from the tape to a desired position in the Z axis.

If a slot is to be milled in the top side of the workpiece in a direction paralleling the X axis, several blocks of information will probably be required to accommodate this character of operation. The tape instructions for each of the three axis will then be written in the order Z only in the first block, which defines the position of the milling cutter in the Z axis with respect to the workpiece, Y only in the second block which will define the depth of cut of the milling cutter on the first pass and X in the third block which will cover the length of the slot to be milled. If the cut is to be milled to a depth greater than that provided by the initial milling cutter pass, the tape format will then describe a new Y dimension which may be included in the third block. When the original pass has been made the tool will be programmed to retract to home position in its X axis. Thereafter it will be positioned again in the Y axis, after which a fourth block must be read in with the X dimension repeated. This may be continued until the desired depth of the slot being milled has been achieved.

If a slot of greater width than that provided by the thickness of the milling cutter is desired, then, after the first pass is made, a new Z dimension may be written following the X-word instruction, to reposition the tool in the Z axis after which the feed in X may be repeated. It will be appreciated at this point that considerable latitude is left to the programmer to select the order of operations to achieve the desired machining with the greatest economy of blocks of information on the tape.

The power controls for each of three axes include arrangement for automatically retracting the machine slides in each of the three axes after the machine operation is completed at the option of the programmer. Each axis is provided with retract limit switches which when actuated indicate that the machine slide for that axis is in fully retracted, or in, home position. These limit switches are generally represented by the reference LS on each of the two machine tools shown. Additionally, the transfer mechanism on the tool is provided with a limit switch indicating that the transfer mechanism is in its home position and ready to begin a transfer part operation. A further transfer part signal is provided by the tape reader. See the tape reader tape format, FIG. 3, row 28 column $f$, in which the square thus identified carries the legend TP, representing transfer part. The simultaneous occurrence of these signals from the last tape reader, from the limit switches in all of the axis of both machine tools and the transfer part signal from the transfer mechanism, affects operation of a gated relay arrangement GR which provides two output signals. One of these output signals is applied to the transfer mechanism drive generally represented by a block identified TMD and the second of these signals is applied as input to a tape reader distributor switch drive generally designated TDD. By reference to FIG. 5, showing the schematic of the tape distributor switch, it will be appreciated that energization of the stepping switch coil effects transfer of tape reader TRA from the milling machine to the input circuits for the control system of the boring machine and switches the tape reader TRC out of the system input connections while at the same time switching in the tape reader TRB as input to the control system for the milling machine. Actuation of the transfer mechanism under the control of the gated relay signal as described in connection with FIG. 1, moves the workpiece out of the boring machine, moves the workpiece from the milling machine to the boring machine and moves the workpiece at the loading station into the milling machine.

We claim:
1. In a control system for positioning a controllable member:
   an input signal system for producing discrete electrical signals indicative of a desired position of said member in accordance with a predetermined signal program, and including at least one correction signal indicating a cor- rection in said discrete electrical signals of said input signal system is to be made;

an incremental position transducer system controlled by said member for producing discrete electrical signals indicative of said member;

electrical means coupled to said input signal system and said transducer system for producing an electrical output when the signals of each system are different;

electrically controlled drive means responsive to said electrical output and coupled to said member for positioning said member;

an adjustable discrete signal device for producing discrete position offset signals indicative of a correction to be made in the discrete signals of said input signal system;

and means forming a part of said input signal system for combining the discrete signals of said adjustable device with the discrete signals of said input system in response to said correction signal.

2. In a control system for positioning a controllable member:

an input signal system for producing respective groups of electrical signals, a correction signal and a sign signal indicating that an addition to or subtraction from the input signal is to be made;

an incremental position transducer system controlled by said member for producing electrical signals in accordance with increments of displacement of said member;

adjustable electrical means producing adjustable groups of electrical signals respectively indicative of a correction to be made to individual groups of said electrical signals of said input signal system;

means controlled by said correction signal for combining an adjustable group of electrical signals with a group of electrical signals of said input signal system in the sense indicated by said sign signal;

electrical comparator means coupled to said input signal system and said transducer system for producing an electrical output when the signals of each system are different;

and electrically controlled drive means for said member coupled to said comparator means for receiving said output signal and controlling said member.

3. A numerically controlled machine tool system for controlling a machine tool member comprising:

input signal circuits for producing respective discrete input signal groups which are differently weighted;

an adjustable signal device for producing respective groups of discrete signals which are differently weighted;

a circulating register having an output circuit;

signal converting and combining circuits including said circulating register, coupled to said input signal circuits and to said adjustable signal device for converting said respective signal groups into serial signal trains and for algebraically combining serial signals from correspondingly weighted signal groups;

an incremental position transducer system coupled to and controlled by said member for producing discrete electrical signals in response to displacement of said member;

a circulating register synchronized with said first circulating register and coupled to said incremental position transducer to receive signals therefrom and having an output circuit;

movement control circuits coupled to the output circuits of both of said circulating registers;

and drive means coupled to said movement control circuits and controlled thereby and coupled to said member to move said member.

4. A numerically controlled machine tool system for controlling a machine tool member comprising:

input signal circuits for producing respective discrete input signal groups which are differently weighted and a sign signal indicating that an addition or subtraction is to be made to at least one of the input signal groups;

an adjustable signal device for producing respective discrete correction signal groups which are differently weighted;

a circulating register having an output circuit;

signal converting and combining circuits, including said circulating register, coupled to said input signal circuits and to said adjustable signal device for converting said respective signal groups into serial signal trains and for algebraically combining serial signals from correspondingly sighted signal groups in response to and in the sense indicated by said sign signal;

an incremental position transducer system coupled to and controlled by said member for producing discrete electrical signals in response to displacement of said member;

a circulating register synchronized with said first circulating register and coupled to said incremental position transducer system to receive signals therefrom and having an output circuit;

movement control circuits coupled to the output circuits of both of said circulating registers;

and drive means coupled to said movement control circuits and controlled thereby and coupled to said member to move said member.

5. In a control system for positioning a controllable member:

means for producing discrete electrical signals indicative of a desired position of said member;

an incremental position transducer system coupled to and controlled by said member for producing discrete electrical signals in response to movement of said member;

circulating register means for receiving and circulating said first-mentioned electrical signals and said second-mentioned electrical signals;

circuit means coupled to said circulating register means for receiving said first-mentioned and said second-mentioned electrical signals and for producing an electrical output when said first-mentioned electrical signals and said second-mentioned electrical signals are different from one another;

and means coupled to said circuit and controlled by said electrical output and coupled to said member for controlling movement of said member.

6. In a control system for positioning a controlable member:

input means for producing discrete electrical signals indicative of a desired position of said member;

incremental position transducer means coupled to and controlled by said member for producing discrete electrical signals in response to movement of said member;

a storage device coupled to said incremental position transducer means for receiving electrical signals therefrom;

delay line storage means;

means coupling said input means and said storage device to said delay line storage means for applying electrical signals to said delay line storage means;

arithmetic circuits coupled to said delay line storage means for receiving electrical signals therefrom and for performing arithmetic operations on received electrical signals;

and means coupled to said arithmetic circuits and controlled thereby and coupled to said member for controlling movement of said member.

7. In a control system for positioning a controllable member;

input means for producing discrete electrical signals indicative of a desired position of said member;

incremental position transducer means coupled to and controlled by said member for producing discrete electrical signals in response to movement of said member;

a storage device coupled to said incremental position transducer means for receiving electrical signals therefrom;

delay line storage means;

circuitry coupling said input means and said storage device to said delay line storage means to apply electrical signals to said delay line storage means;

timing circuits coupled to said circuitry for controlling the timing of the application of electrical signals to said delay line storage means;

arithmetic circuits coupled to said delay line storage means for receiving electrical signals therefrom and for performing arithmetic operations on received electrical signals;

and means coupled to said arithmetic circuits and controlled thereby and coupled to said member for controlling movement of said member.

UNITED STATES PATENT OFFICE
CERTIFICATE OF CORRECTION

Patent No. 3,609,497           Dated September 28, 1971

Inventor(s) Tom T. Kumagai, et al

It is certified that error appears in the above-identified patent and that said Letters Patent are hereby corrected as shown below:

In the specification, column 2, line 27 "(flip-flops FQ1, FQ)" should read --(flip-flops FQ1, FQ4)--. Column 6, line 39, after "circuit" please insert --means--.

Signed and sealed this 16th day of May 1972.

(SEAL)
Attest:

EDWARD M. FLETCHER, JR.           ROBERT GOTTSCHALK
Attesting Officer           Commissioner of Patents